(12) United States Patent
Rhodes et al.

(10) Patent No.: US 6,932,424 B2
(45) Date of Patent: Aug. 23, 2005

(54) ARTICULATED BASE WITH GUIDE TRACK FOR FOLD-IN-FLOOR VEHICLE SEAT

(75) Inventors: Louis A Rhodes, Farmington Hills, MI (US); Douglas J Quigley, Rochester, MI (US); Joseph L Salani, Oxford, MI (US); Carl Mather, Lake Orion, MI (US); John V Keane, Auburn Hills, MI (US); David J Ewers, Leonard, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 79 days.

(21) Appl. No.: 10/647,631

(22) Filed: Aug. 25, 2003

(65) Prior Publication Data

US 2004/0100130 A1 May 27, 2004

Related U.S. Application Data

(60) Provisional application No. 60/405,453, filed on Aug. 23, 2002.

(51) Int. Cl.[7] .................................................. B60N 2/36
(52) U.S. Cl. ........................................ 297/15; 296/65.09
(58) Field of Search .................. 297/15, 331; 296/65.1, 296/65.09, 65.13, 65.14, 66, 69

(56) References Cited

U.S. PATENT DOCUMENTS

| | | | |
|---|---|---|---|
| 847,707 A | 3/1907 | Spindler | |
| 1,887,947 A | 11/1932 | Savale | |
| 3,202,453 A | * 8/1965 | Richards | ...................... 296/66 |
| 4,005,902 A | 2/1977 | Balin | |
| 4,699,418 A | 10/1987 | Plavetich | |
| 4,846,520 A | 7/1989 | Acuto et al. | |
| 4,925,228 A | 5/1990 | Pipon et al. | |
| 5,038,437 A | 8/1991 | Russell et al. | |
| 5,195,795 A | 3/1993 | Cannera et al. | ............ 296/65.1 |
| 5,269,581 A | 12/1993 | Odagaki et al. | .............. 296/66 |

(Continued)

FOREIGN PATENT DOCUMENTS

| | | |
|---|---|---|
| EP | 000120817 | 10/1984 |
| FR | 002575708 | 7/1986 |
| FR | 2735081 | 12/1996 |
| JP | 363227435 | 9/1988 |
| JP | 401095947 | 4/1989 |
| JP | 411005477 | 1/1999 |
| JP | 2003094997 | 4/2003 |
| JP | 2003212017 | 7/2003 |
| JP | 3507480 | 3/2004 |
| KR | 98057165 | 9/1998 |
| WO | WO 0002/14104 | 2/2002 |

* cited by examiner

Primary Examiner—Peter R. Brown
(74) Attorney, Agent, or Firm—Rhonda L. McCoy-Pfau

(57) ABSTRACT

A fold-in-floor vehicle seat is supported in a use position on a generally flat load floor. To move the seat into a storage position, the seat is lowered onto a portion of the load floor that acts as an articulated base for the seat. The base approximates the footprint of the seat, and covers a storage cavity directly below the seat and configured to closely receive the seat. The base is free floating with respect to the remainder of the load floor, but is pivotally connected to the vehicle by an articulating arm that allows the base to rotate about a pivot point through an arcuate section of guide track in the storage cavity, and the arm then articulates to allow the base to travel through a straight portion of track. The arm then returns to its starting position as the base traverses a second arcuate section of track, having now inverted so that the seat is lodged within the storage cavity.

4 Claims, 5 Drawing Sheets

U.S. PATENT DOCUMENTS

| | | |
|---|---|---|
| 5,482,349 A | 1/1996 | Richter et al. |
| 5,492,386 A | 2/1996 | Callum ........................ 296/64 |
| 5,527,087 A | 6/1996 | Takeda et al. |
| 5,570,931 A | 11/1996 | Kargilis et al. ........ 297/376.12 |
| 5,839,773 A | 11/1998 | Ban et al. ................ 296/65.09 |
| 5,868,451 A | 2/1999 | Uno et al. |
| 5,871,255 A | 2/1999 | Harland et al. ............. 297/257 |
| 5,890,758 A | 4/1999 | Pone et al. ................... 297/15 |
| 5,927,789 A | 7/1999 | Mezzadri et al. |
| 5,975,612 A | 11/1999 | Macey et al. |
| 5,979,964 A | 11/1999 | Ban et al. ..................... 296/66 |
| 6,000,751 A | 12/1999 | Kato et al. ................... 297/15 |
| 6,089,641 A | 7/2000 | Mattarella et al. |
| 6,106,046 A | 8/2000 | Reichel ................... 296/65.09 |
| 6,123,380 A | 9/2000 | Sturt et al. ............... 296/65.09 |
| 6,129,404 A | 10/2000 | Mattarella et al. |
| 6,129,405 A | 10/2000 | Miyahara et al. |
| 6,193,317 B1 | 2/2001 | Mitschelen et al. |
| 6,231,101 B1 | 5/2001 | Kamida et al. ............... 296/63 |
| 6,234,553 B1 | 5/2001 | Eschelbach et al. ..... 296/65.14 |
| 6,270,140 B1 | 8/2001 | Opfer et al. |
| 6,279,982 B1 | 8/2001 | Nishimura et al. |
| 6,332,650 B1 | 12/2001 | Krist et al. |
| 6,352,310 B1 | 3/2002 | Schmidt et al. |
| 6,371,559 B1 | 4/2002 | Kienzle et al. |
| 6,398,307 B1 | 6/2002 | Schmidt et al. |
| 6,406,084 B1 | 6/2002 | De Campos et al. |
| 6,416,107 B1 | 7/2002 | Kanaguchi et al. |
| 6,425,619 B2 | 7/2002 | Ney |
| 6,464,279 B1 | 10/2002 | Schambre et al. |
| 6,629,721 B1 | 10/2003 | Macey |
| 6,644,730 B2 | 11/2003 | Sugiura et al. |
| 6,648,393 B1 | 11/2003 | Milnar et al. |
| 6,682,120 B2 | 1/2004 | Kamida et al. |
| 6,688,666 B2 | 2/2004 | Neale et al. |
| 6,705,657 B2 * | 3/2004 | Kutomi et al. ........... 296/65.09 |
| 6,705,658 B2 | 3/2004 | Jach et al. |
| 6,709,040 B1 * | 3/2004 | Drew et al. .................... 296/66 |
| 2001/0002759 A1 | 6/2001 | Nishide |
| 2001/0052718 A1 * | 12/2001 | Sugiura et al. ............... 297/15 |
| 2001/0054835 A1 | 12/2001 | Feng |
| 2003/0094830 A1 | 5/2003 | Kamida et al. |

ARTICULATED BASE WITH GUIDE TRACK FOR FOLD-IN-FLOOR VEHICLE SEAT

CROSS-REFERENCE TO RELATED APPLICATIONS

This application claims the benefit of Provisional Application Ser. No. 60/405,453, filed Aug. 23, 2002, entitled "Fold-in floor vehicle seat arrangements."

STATEMENT REGARDING FEDERALLY SPONSORED RESEARCH

Not applicable.

BACKGROUND OF THE INVENTION

1. Field of the Invention

The invention relates to automobile seating components, and more specifically to automobile seating components adapted to fold and store in an in-floor storage receptacle.

2. Description of Related Art

Automobiles with folding or removable seats are well known in the art. The purpose of such seats is to adapt the automobile to multiple functions, such as carrying passengers or carrying cargo. Each of these methods of adapting the automobile has had its respective advantages and disadvantages. For instance, a folding seat can require minimal actions on the part of the user, but afford only a partial use of available vehicle volume for cargo. The cargo volume may also be uneven, providing an irregular load floor. The removable seat maximizes the availability of cargo volume, but requires much greater effort on the part of the user to physically remove the seat, and requires that the removed seat be stored outside the vehicle. The seat may thus not be available for conversion back to passenger-carrying away from the seat storage location.

It would be advantageous to provide a seat which incorporates the convenience of a folding seat with the maximization of uniform cargo volume of the removable seat.

BRIEF SUMMARY OF THE INVENTION

A fold-in-floor vehicle seat is supported in a use position on a generally flat load floor. To move the seat into a storage position, the seat is lowered onto a portion of the load floor that acts as an articulated base for the seat. The base approximates the footprint of the seat, and covers a storage cavity directly below the seat and configured to closely receive the seat. The base is free floating with respect to the remainder of the load floor, but is pivotally connected to the vehicle by an articulating arm that allows the base to rotate about a floating pivot point through an irregular guide track in the storage cavity. The arm returns to its starting position as the base traverses the track and inverts so that the seat is lodged within the storage cavity and an underside of the base presents a new load floor.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

Figure 1:
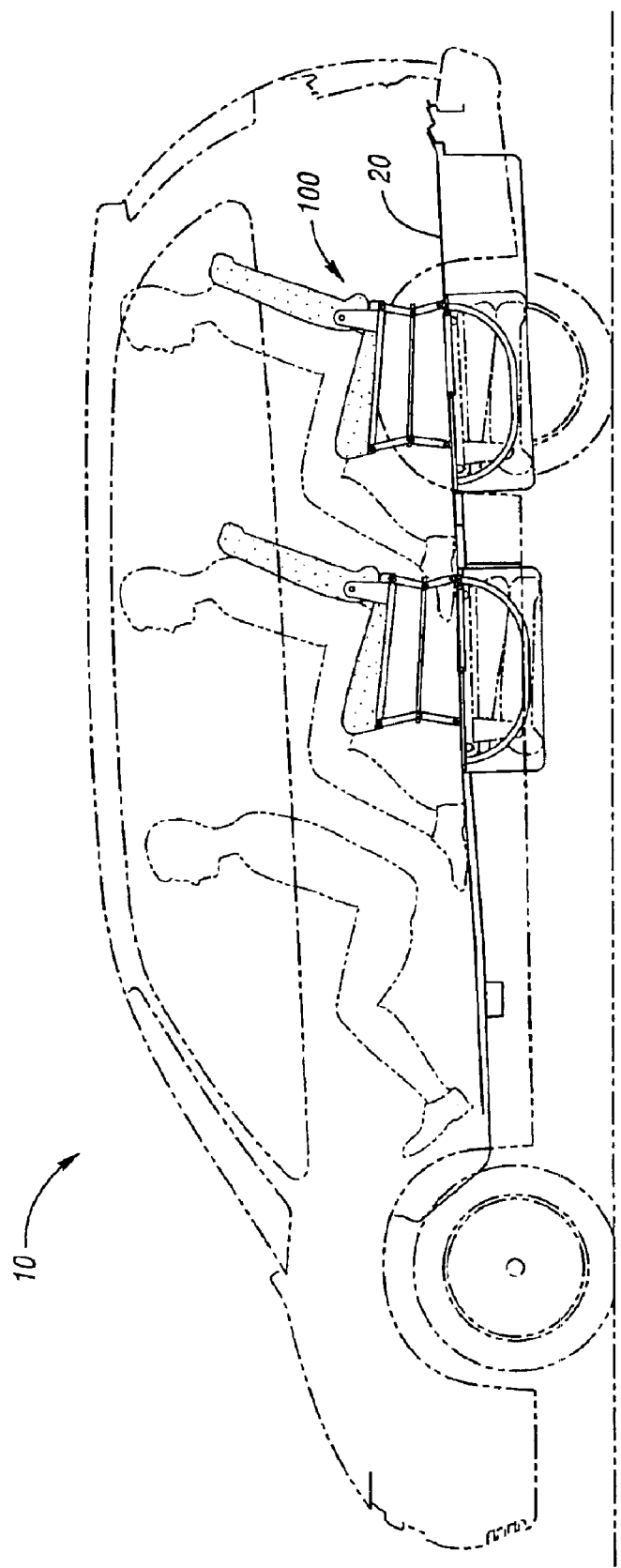
FIG. 1 is a side view of a vehicle incorporating an assembly comprising an articulated base with guide track for fold-in-floor vehicle seats according to the invention.

Referring to FIG. 1, an automobile 10 includes an interior load floor 20, and incorporates an assembly 100 comprising a fold-in floor vehicle seat with articulated base and guide track according to the invention. In the illustration of FIG. 1, two rows each containing at least one assembly 100 of fold-in floor vehicle seats are incorporated into the vehicle 10.

Figure 2:
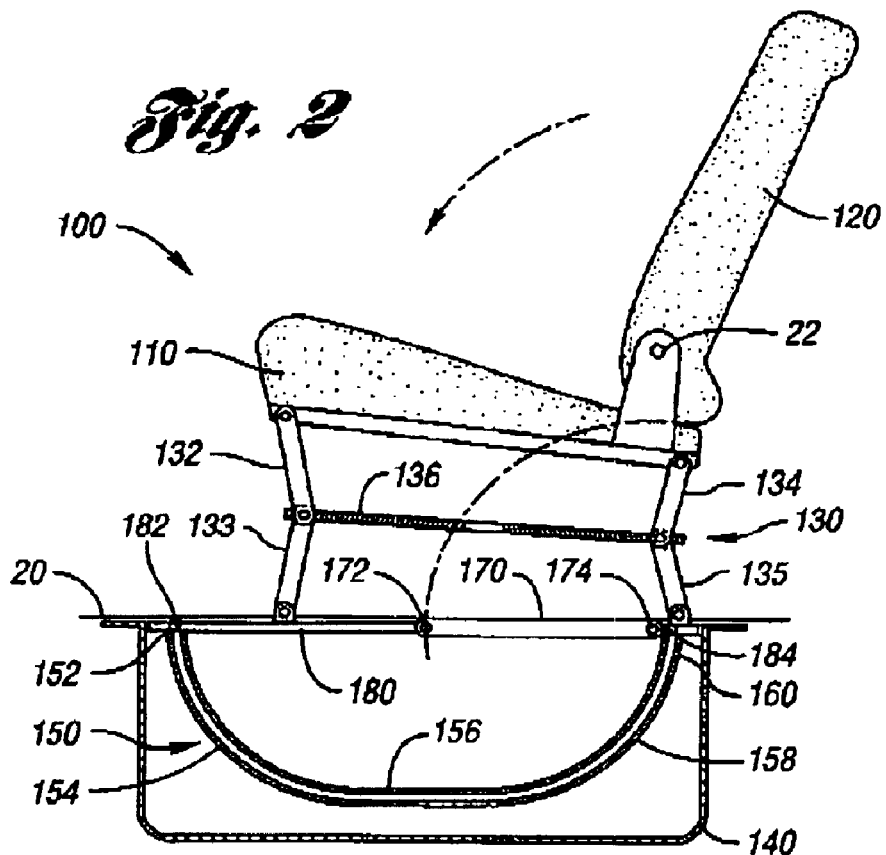
FIG. 2 is an enlarged side view of the articulated base with guide track for fold-in-floor vehicle seats of FIG. 1, with the vehicle seat in a seating position, and with the seat back in a folded position in phantom.

Beginning with the enlarged view of FIG. 2, seat assembly 100 comprises a seat cushion 110, seat back 120, leg assembly 130, storage receptacle 140 and articulated base 180. Seat back 120 is pivotally attached to seat cushion 110 at pivot point 122. Seat back 120 is pivotable from an extended position shown in FIG. 2 to a collapsed position shown in FIG. 2 in phantom.

Figure 3:
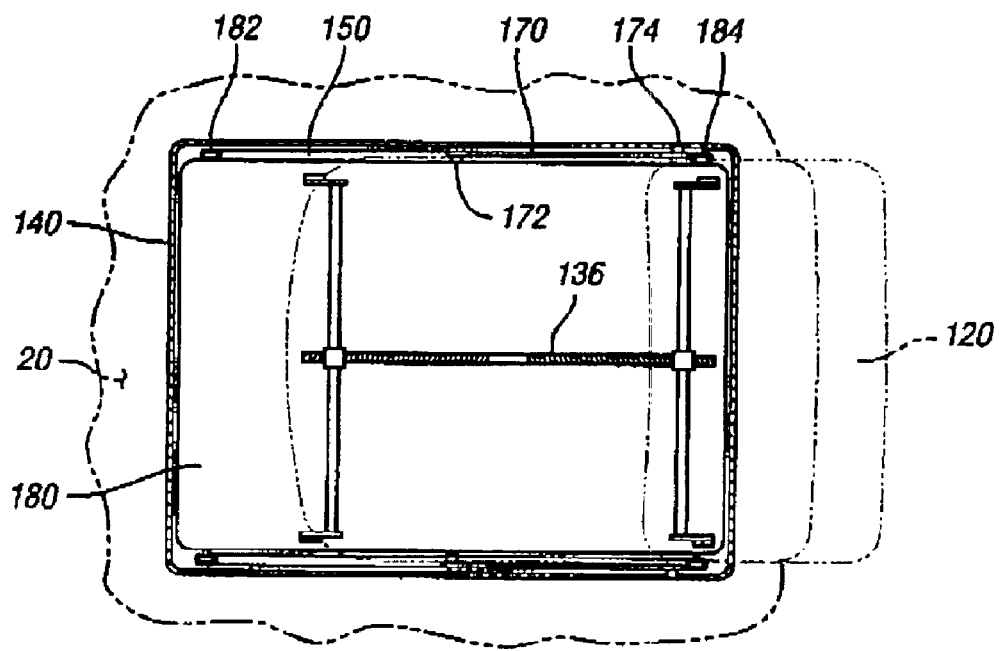
FIG. 3 is a plan view of the invention of FIG. 2.

With further reference to FIGS. 2–3, leg assembly 130 comprises upper front legs 132 pivotally connected to lower front legs 133, and upper rear legs 134 pivotally connected to lower rear legs 135. Each of the front and rear lower legs 133, 135 are further pivotally connected to articulated base 180. Front legs 132, 133 are operably connected to rear legs 134, 135 by screw drive 136. Screw drive 136 is an example of a mechanism for lowering seat cushion 110 from the extended position shown in FIGS. 1–2 and the collapsed position shown in FIGS. 4–6.

Articulated base 180 is operably connected to vehicle 10 through a plurality of pins/rollers 182, 184 engaging guide track 150. Guide track 150 is fixedly mounted within storage receptacle 140 which is mounted to vehicle 10. Articulated base 180 is further connected to storage receptacle 140, and relative to guide track 150, through articulating arm 170. Arm 170 is pivotally mounted to storage receptacle 140 at fixed pivot 174, and is pivotally mounted to articulated base 180 at floating pivot 172.

As shown in FIG. 2, guide track 150 is comprised of a first semi-circular segment 154, a straight segment 156, and a second semi-circular segment 158. A first end 152 of track 150 receives pin/roller 182 with the assembly 100 in the extended or use position shown in FIGS. 2–3. Second end 160 of track 150 receives pin/roller 184. Pins/rollers 182, 184 are adapted to align with and engage track 150 in the sense of a roller, but further incorporate a retractable pin portion for engaging apertures (not shown) in the track 150 for locking the assembly 100 in the use/extended position and in the storage position.

Figure 4:
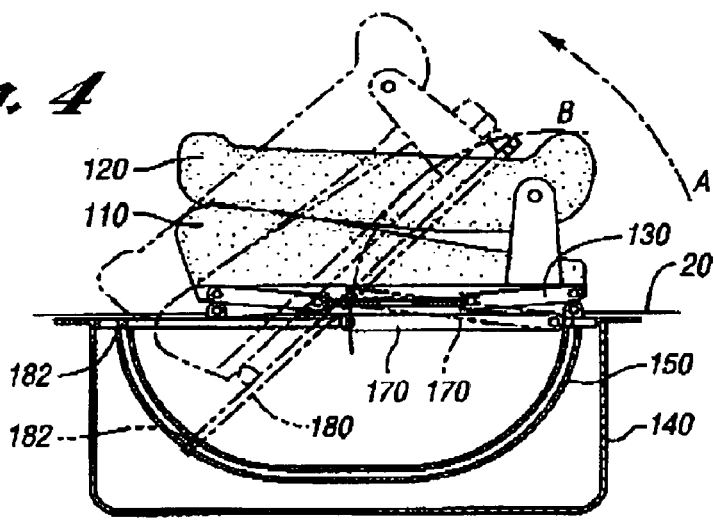
FIG. 4 is the side view of FIG. 2, with the vehicle seat in a collapsed position, and the assembly partially rotated toward a storage position in phantom.

Referring now to FIG. 4, the assembly 100 is shown with the seat back 120 in a folded position against seat cushion 110, and leg assembly 130 in a collapsed position such that seat cushion 110 is collapsed down against articulated base 180. As shown in phantom in FIG. 4, the collapsed seat is adapted to be rotated with articulated base 180 in the direction indicated by arrow A. Pins 182, 184 must be released from track 150 for articulated base 180 to begin rotation about floating pivot 172.

Figure 5:
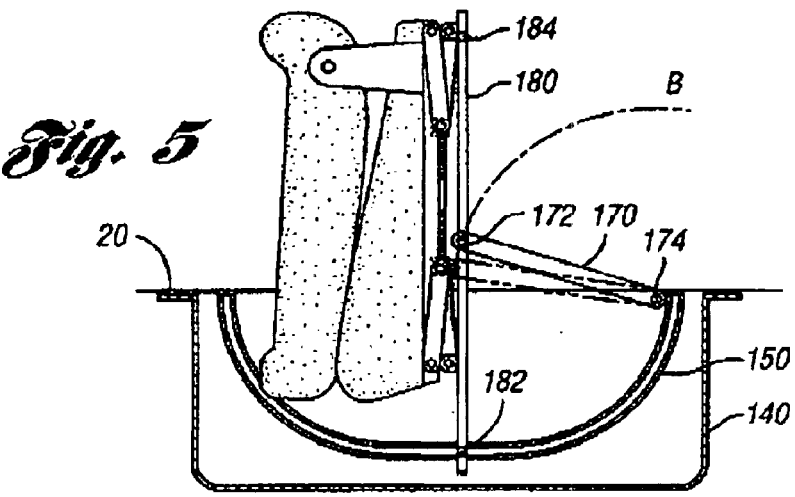
FIG. 5 is the side view of FIGS. 2 and 4, with the assembly further rotated toward the storage position.

As shown in FIGS. 4–5, as articulated base 180 is rotated and pin 182 passes along guide track 150, floating pivot 172 must move through arc B on articulated arm 170, in order to accommodate the non-circular nature of guide track 150 and keep a constant distance between floating pivot 172 and the location on guide track 150 of pin 182. Guide track 150 is shown as being formed with two semi-circular segments 154, 158 linked by straight segment 156, but the invention is not to be limited to this particular configuration, as the floating pivot 172 would function in a like manner with differently arranged guide tracks that display a constant to decreasing distance from the starting position of the floating pivot 172 (as found in FIG. 2) to the guide track 150.

Figure 6:
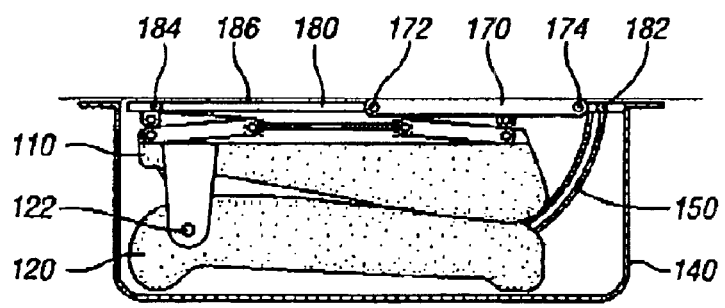
FIG. 6 is the side view of FIGS. 2, 4 and 5, with the assembly in the storage position.
Figure 7:
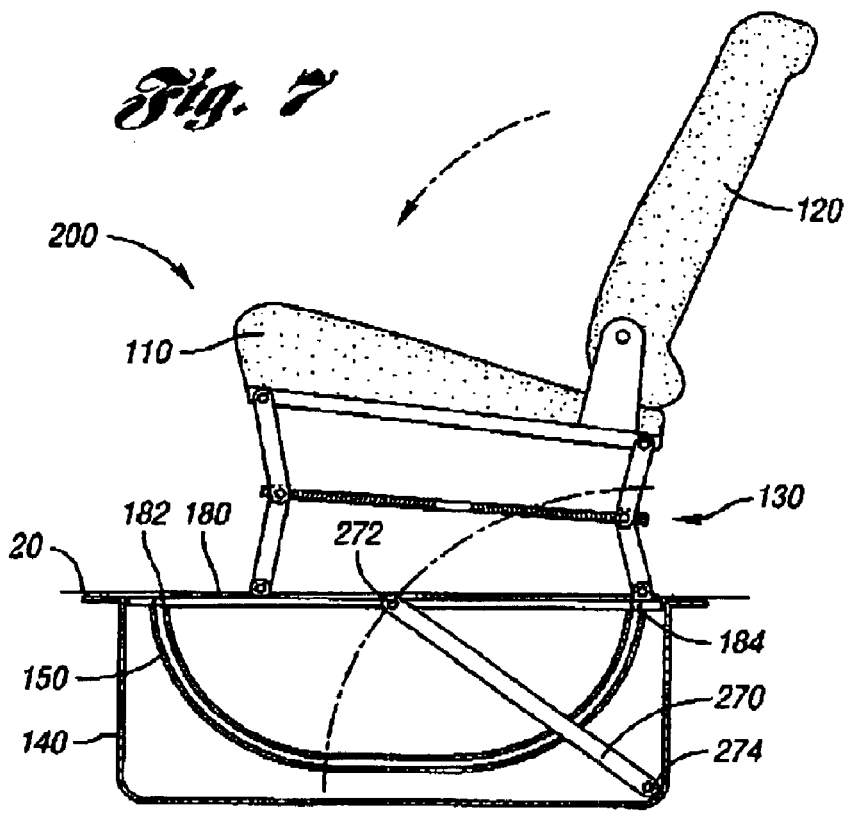
FIG. 7 is an enlarged side view of a further embodiment of the invention.

Referring to FIG. 6 as the articulated base 180 is rotated 180 degrees, pins/rollers 182, 184 have switched places in guide track 150, and are in position to engage the apertures (not shown) to lock the base 180 in the inverted position. Folded seat cushion 110 and back 120 are fully housed in storage receptacle 140, and articulating arm 170 and floating pivot 172 have returned to their original positions. Articulated base 180 further includes a flat underside 186 that, with articulated base 180 inverted, forms a continuous surface with vehicle load floor 20.

FIGS. 7–11 discloses a further embodiment of an assembly 200 according to the invention. Like elements according to the assembly of FIGS. 1–6 are provided with like reference numerals.

Figure 8:
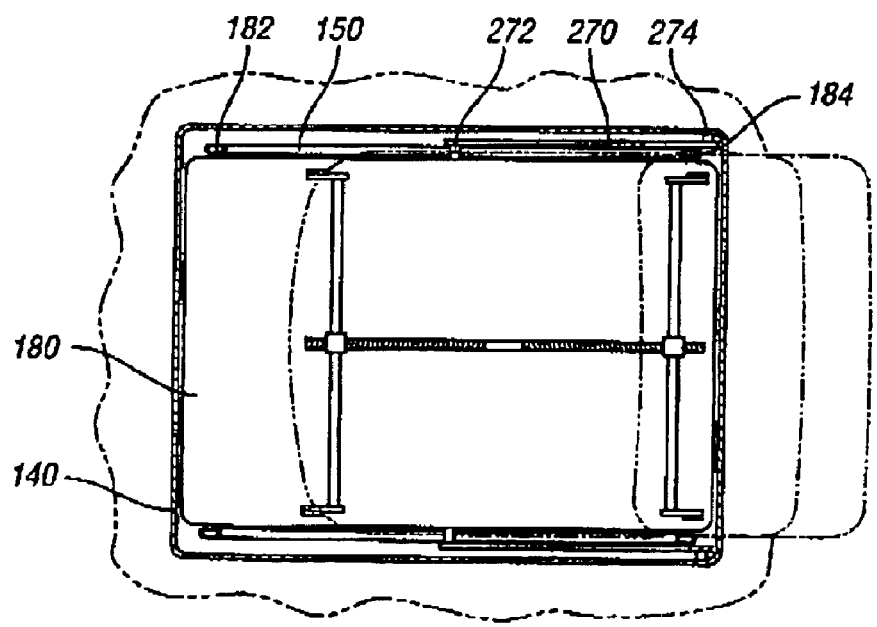
FIG. 8 is a plan view of the invention of FIG. 7.
Figure 9:
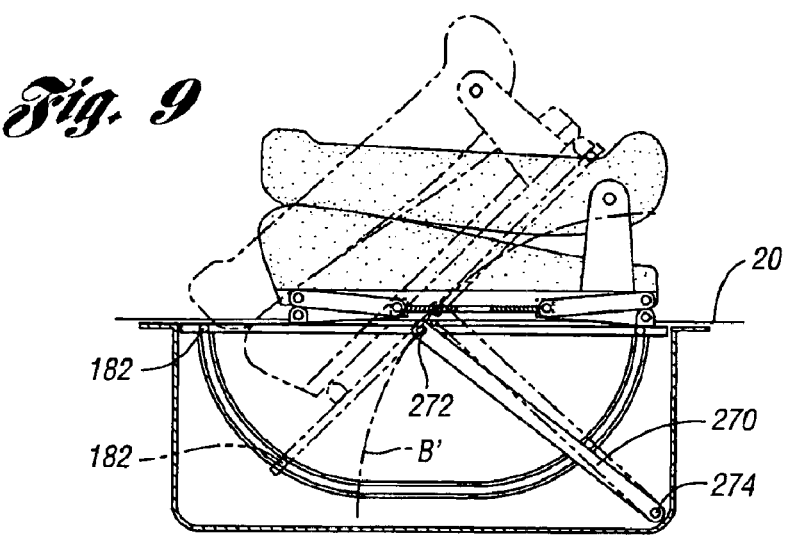
FIG. 9 is the side view of FIG. 7, with the vehicle seat in a collapsed position, and the assembly partially rotated toward a storage position in phantom.
Figure 10:
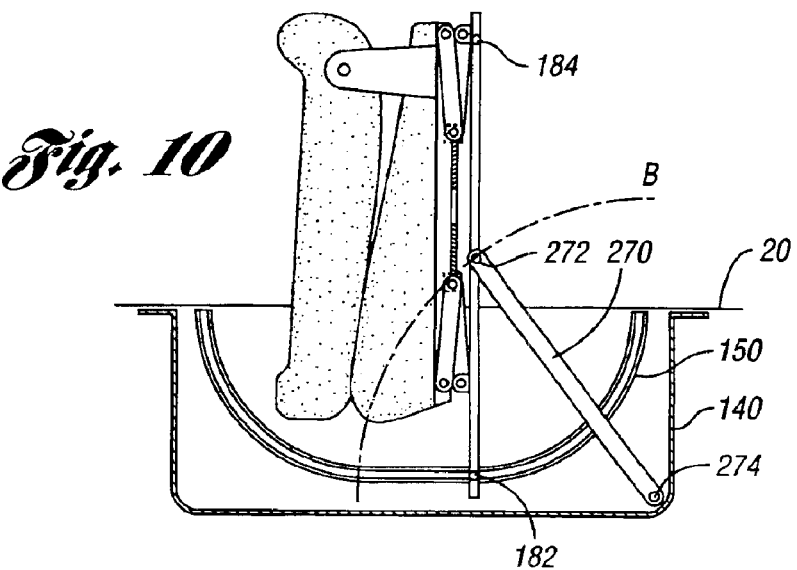
FIG. 10 is the side view of FIGS. 7 and 9, with the assembly further rotated toward the storage position.
Figure 11:
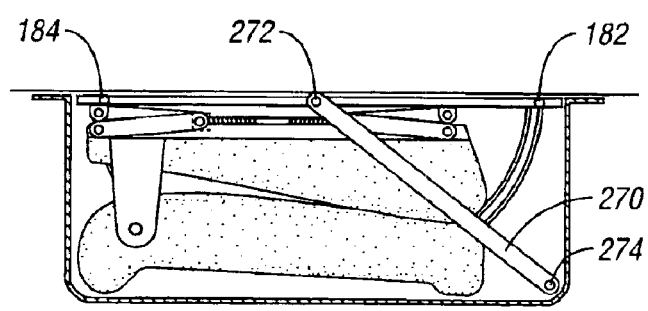
FIG. 11 is the side view of FIGS. 7, 9 and 10, with the assembly in the storage position.

Articulating arm 270 according to the further embodiment of the invention is mounted in a remote corner of receptacle 140, compared to arm 170 mounted inside of track 150. In order to avoid interference with pin/roller 182 as it traverses guide track 150, articulating arm 270 is positioned outwardly of guide track 150, as shown in FIG. 8.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A method of folding a vehicle seat into a floor of a vehicle, comprising the steps of:

providing a vehicle seat adapted to fold from a seating condition to a collapsed condition, the seat being mounted to a movable section of vehicle floor, wherein:
the movable section covers an in-the-floor receptacle adapted to receive the vehicle seat in the collapsed condition;
the movable section is configured with an outwardly extending guide pin and the receptacle is configured with a guide track for receiving the guide pin; and
the movable section is pivotally connected to a guide bar which is further pivotally connected to the receptacle;

folding the vehicle seat into the collapsed condition against the movable section; and rotating the movable section so that the guide pin travels along the guide track, wherein the movable section articulates with the guide bar as the pin travels along the guide track, until the movable section is inverted with the vehicle seat in the collapsed condition contained within the receptacle.

2. The method of claim 1, wherein the movable section is further configured be contiguous with the vehicle floor while inverted.

3. The method of claim 2, wherein the movable section is further configured to lock in place over the receptacle with the vehicle seat contained within the receptacle.

4. The method of claim 1, wherein the movable section is further configured to lock in place over the receptacle with the vehicle seat in the seating condition.

* * * * *